D. P. RAMSDELL.
WOODEN-SHOE MACHINE.
No. 186,164. Patented Jan. 9, 1877.
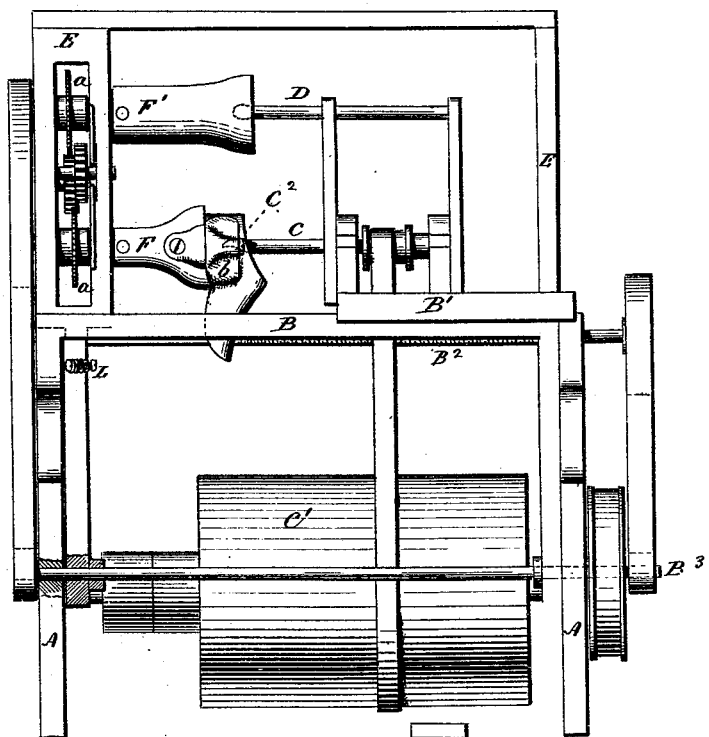
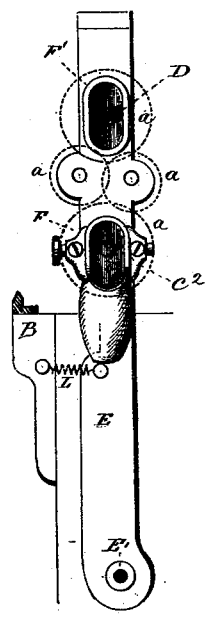
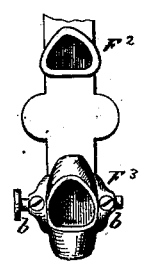
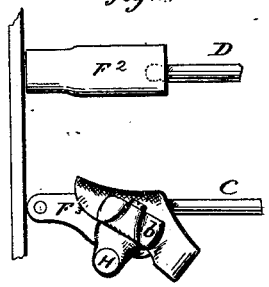
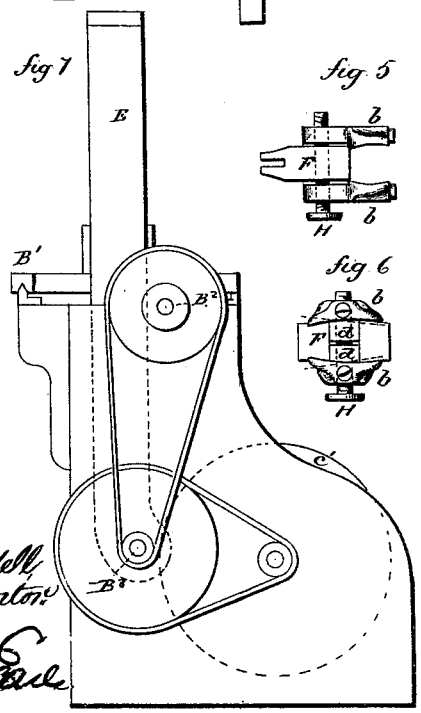
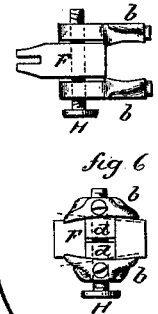
Witnesses
J. W. Shumway
Clara Broughton
Dan'l P. Ramsdell
Inventor
By Atty
N. PETERS, PHOTO-LITHOGRAPHER, WASHINGTON, D. C.

UNITED STATES PATENT OFFICE.

DANIEL P. RAMSDELL, OF NEW HAVEN, CONN., ASSIGNOR OF ONE-HALF HIS RIGHT TO CORNELIUS B. PAYNE, OF BROOKLYN, N. Y.

IMPROVEMENT IN WOODEN-SHOE MACHINES.

Specification forming part of Letters Patent No. 186,164, dated January 9, 1877; application filed March 27, 1876.

*To all whom it may concern:*

Be it known that I, DANIEL P. RAMSDELL, of New Haven, in the county of New Haven and State of Connecticut, have invented an Improvement in Wooden-Shoe Machines; and I do hereby declare the following, when taken in connection with the accompanying drawings and the letters of reference marked thereon, to be a full, clear, and exact description, and which said drawings constitute part of this specification, and represent in—

Figure 1, a front view of the machine; Fig. 2, a partial vertical section; Figs. 3, 4, 5, and 6 detached views, and Fig. 7 an end view.

This invention relates to an improvement in machines for making wood shoes, the object being to automatically work out the inside; and the invention consists in the mechanism as hereinafter described, and as recited in the claims.

A is the frame of the machine; B, the bed, in which is a carriage, $B^1$, guided by suitable ways, so as to move longitudinally thereon, and may be thus moved by a leading-screw, $B^2$, driven from the principal shaft $B^3$. In this carriage there is mounted a mandrel, C, caused to revolve rapidly by the application of power thereto. (Here represented as from a drum, $C^1$, on the shaft $B^3$.) Parallel with this mandrel is a second or stationary guide-mandrel, D. In the end of the mandrel C there is arranged a cutter, $C^2$. E is a swinging frame, hung below upon a shaft, E', so as to swing transversely to the mandrels C D. In this carriage, and in axial line with the cutter-mandrel, the shoe-holder F is arranged, and in axial line with the mandrel D the former $F^1$ is arranged. These are caused to revolve alike by the application of power thereto, through a chain of gearing, $a$.

The shoe-holder is constructed as seen in Figs. 5 and 6, and consists of a pair of jaws, $b\ b$, each pivoted to a slide, $d$, arranged in the body of the shoe-holder F, so as to slide freely toward each other, and to oscillate freely on the pivot so as to assume any angle or position relative to each other. They are operated by a right and left screw, H, by the turning of which the jaws may be drawn toward or from each other. The exterior of the shoe is preferably shaped by means of what is known as the "Blanchard lathe." Thus shaped, the heel portion is placed between the jaws $b$ at right angles to the axis of the cutter, the former $F^1$ having a cavity corresponding to that desired for the heel portion of the shoe, and into this former the mandrel D passes while the cutter is revolving, and the cutter will work its way into the shoe-blank, and dress or cut out the heel portion to correspond with the cavity in the former. This done, the shoe and former are removed, a new former, $F^2$, Figs. 3 and 4, introduced, which has a cavity corresponding to that required to be made in the forward part of the shoe. The partially-formed shoe is then introduced in a corresponding position, and for this purpose a holder, $F^3$, with the same kind of clamps, is arranged so as to hold the shoe in a nearer parallel position to the cutting-mandrel, as seen in Fig. 4, and so that the cutter can run into the toe of the shoe, and dress out that portion corresponding to the cavity in the former $F^2$ and complete the shoe. Thus, by these two operations the interior of the shoe is completely and perfectly formed without changing other parts of the machine than the former and holder. Two machines would, therefore, avoid this change, but in both cases the holder is substantially the same.

The cutter-carriage is fed up to the work by the leading-screw $B^2$ or otherwise.

The frame E, swinging transversely to the cutting-mandrel and guide-mandrel D, enables the inner surface of the former to come into contact with the mandrel D whatever may be its shape, and it is borne up to the work by a spring, L, or otherwise.

While it is preferable to rotate the former and holder, the same result will be accomplished by arranging them upon a universal carriage or a carriage which may be moved vertically and transversely, it only being essential to keep the former up to the mandrel D. In making shoes rights and lefts the same former answers by shifting the gearing so that the former will revolve in an opposite direction—that is to say, the former revolving in one direction will shape the cavity for a right shoe, and in the opposite direction for a left shoe.

I claim—

1. In a machine for making wood shoes, the holder, consisting of the universal jaws $b\ b$, arranged in the body F and combined with the clamping-screw H, substantially as specified.

2. In a machine for making wood shoes, the combination of the shoe-holder and the former, constructed with a cavity corresponding to the cavity to be made in the shoe, a former-mandrel, D, and a cutter-mandrel, C, the former and shoe holder simultaneously guided in the same path, substantially as described.

DANIEL P. RAMSDELL.

Witnesses:
JOHN E. EARLE,
CLARA BROUGHTON.